(12) United States Patent
Lin et al.

(10) Patent No.: US 12,235,949 B2
(45) Date of Patent: Feb. 25, 2025

(54) CLOUD SERVER AND OPERATION METHOD THEREOF

(71) Applicant: CYBER POWER SYSTEMS, INC., Taipei (TW)

(72) Inventors: Yung-Hsiang Lin, Taipei (TW); Steven Lin, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 261 days.

(21) Appl. No.: 17/890,680

(22) Filed: Aug. 18, 2022

(65) Prior Publication Data

US 2023/0385399 A1  Nov. 30, 2023

(30) Foreign Application Priority Data

May 30, 2022  (CN) .......................... 202210596400.8

(51) Int. Cl.
*G06F 21/44*  (2013.01)
*G06F 21/45*  (2013.01)

(52) U.S. Cl.
CPC .............. *G06F 21/44* (2013.01); *G06F 21/45* (2013.01)

(58) Field of Classification Search
None
See application file for complete search history.

(56) References Cited

U.S. PATENT DOCUMENTS

| | | | |
|---|---|---|---|
| 9,910,471 B1* | 3/2018 | Marr | G06F 1/26 |
| 9,965,013 B1* | 5/2018 | McGee | G06F 1/30 |
| 2016/0224048 A1* | 8/2016 | Rooyakkers | G09C 1/00 |
| 2017/0063566 A1* | 3/2017 | Seminario | H04L 67/12 |
| 2018/0034888 A1* | 2/2018 | Cohen | H04L 63/061 |
| 2019/0107877 A1* | 4/2019 | O'Toole | G06F 1/3212 |
| 2020/0097060 A1* | 3/2020 | Hanna | G06F 1/3209 |
| 2020/0258335 A1* | 8/2020 | Davis | H04W 12/06 |
| 2021/0110024 A1* | 4/2021 | Bein | G06F 21/44 |
| 2021/0118068 A1* | 4/2021 | Deshmukh | H04L 12/1421 |
| 2021/0181699 A1* | 6/2021 | Rice | G06F 11/3089 |
| 2021/0303690 A1* | 9/2021 | Goodson, II | G06F 21/81 |

FOREIGN PATENT DOCUMENTS

| | | |
|---|---|---|
| CN | 110609536 A | 12/2019 |
| TW | 202133194 A | 9/2021 |

* cited by examiner

*Primary Examiner* — Oleg Korsak
*Assistant Examiner* — Shadi H Kobrosli
(74) *Attorney, Agent, or Firm* — BACON & THOMAS, PLLC

(57) ABSTRACT

A cloud server and an operation method thereof are provided. The cloud server is communicatively connected to at least one electronic device and at least one power device. The cloud server is used for determining whether an event occurs on any of the power devices, and determining whether a warning needs to be issued in response to the event. When both are determined to be yes, the cloud server pushes an alert message, generates a security key and a security lock, and transmits the security lock to the electronic devices associated with the event. Only when receiving a confirmation message in response to the alert message within a valid unlock time, the cloud server transmits the security key to the electronic devices associated with the event, so that the electronic devices associated with the event start to perform a corresponding operation after unlocking.

54 Claims, 3 Drawing Sheets

CLOUD SERVER AND OPERATION METHOD THEREOF

BACKGROUND OF THE INVENTION

Field of the Invention

The present invention relates to the technical field of power supply, and in particular, to a cloud server suitable for use with power devices and an operation method thereof.

Description of Related Art

Power devices, such as uninterruptible power systems (UPSs), power distribution units (PDUs), and auto transfer switches (ATSs), are used to supply power to various electronic devices, such as computers, servers, routers, network equipment, communication equipment, and medical equipment, so that the electronic devices can operate normally.

When a power event occurs on a power device, a user normally has to deal with the electronic device powered by the power device. For example, when a UPS that supplies power to a computer runs out of battery, the user must shut down the computer before the power supplying of the UPS is interrupted, so as to prevent the computer from being damaged or loss of important data. However, this approach has a fatal shortcoming, that is, when an event occurs, the user must be next to the computer in order to make a timely response.

SUMMARY OF THE INVENTION

An object of the present invention is to provide a cloud server, which can be served as a solution to the aforementioned shortcoming.

Another object of the present invention is to provide an operation method of the aforementioned cloud server.

In order to achieve the above object, the present invention provides a cloud server, which comprises a first communication module, a second communication module, a database, a web server module, an execution module, an alert event processing module, and a security verification module. The first communication module is configured for communicatively connected at least one electronic device. The second communication module is configured for communicatively connected at least one power device. The power devices are configured for supplying power to the electronic devices. The database is configured for storing a user setting. The user setting records a variety of different events that may occur on the power devices, and records a corresponding operation that the electronic devices need to perform for each event. The web server module has an alert message push module. The alert event processing module is configured for receiving the information provided by the power devices through the second communication module, so as to determine whether an event occurs on any of the power devices, and determine whether a warning needs to be issued in response to the event according to the user setting. When both are determined to be yes, the alert event processing module notifies the electronic devices associated with the event through the execution module to prepare to perform the corresponding operation, and pushes an alert message through the alert message push module, wherein the alert message comprises a message asking whether to perform the corresponding operation of the event. When the alert event processing module determines that the warning needs to be issued, the security verification module generates a security key, a security lock and a valid unlock time, and transmits the security lock to the electronic devices associated with the event through the execution module. The security verification module is also used to receive a confirmation message confirming the execution of the corresponding operation through the web server module, and determine whether the confirmation message is received within the valid unlocking time. When the confirmation message is received within the valid unlocking time, the security verification module transmits the security key to the electronic devices associated with the event through the execution module, so that the electronic devices associated with the event can perform an unlocking operation on the security lock accordingly, and perform the corresponding operation after unlocking.

In order to achieve the above object, the present invention further provides an operation method of a cloud server. The cloud server comprises a first communication module and a second communication module. The first communication module is used for communicatively connected at least one electronic device. The second communication module is used for communicatively connected at least one power device. The power devices are configured for supplying power to the electronic devices. The operation method comprises following steps: receiving the information provided by the power devices through the second communication module, and determining whether an event occurs on any of the power devices accordingly; determining whether a warning needs to be issued in response to the event according to a user setting, wherein the user setting records a variety of different events that may occur on the power devices, and records a corresponding operation that the electronic devices need to perform for each event; when it is determined that the warning needs to be issued, notifying the electronic devices associated with the event to prepare to perform the corresponding operation, pushing an alert message, generating a security key, a security lock and a valid unlock time, and transmitting the security lock to the electronic devices associated with the event, wherein the alert message comprises a message asking whether to perform the corresponding operation of the event; determining whether a confirmation message confirming the execution of the corresponding operation is received, and determining whether the confirmation message is received within the valid unlocking time; and when it is determined that the confirmation message is received within the valid unlocking time, transmitting the security key to the electronic devices associated with the event, so that the electronic devices associated with the event can perform an unlocking operation on the security lock accordingly, and perform the corresponding operation after unlocking.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
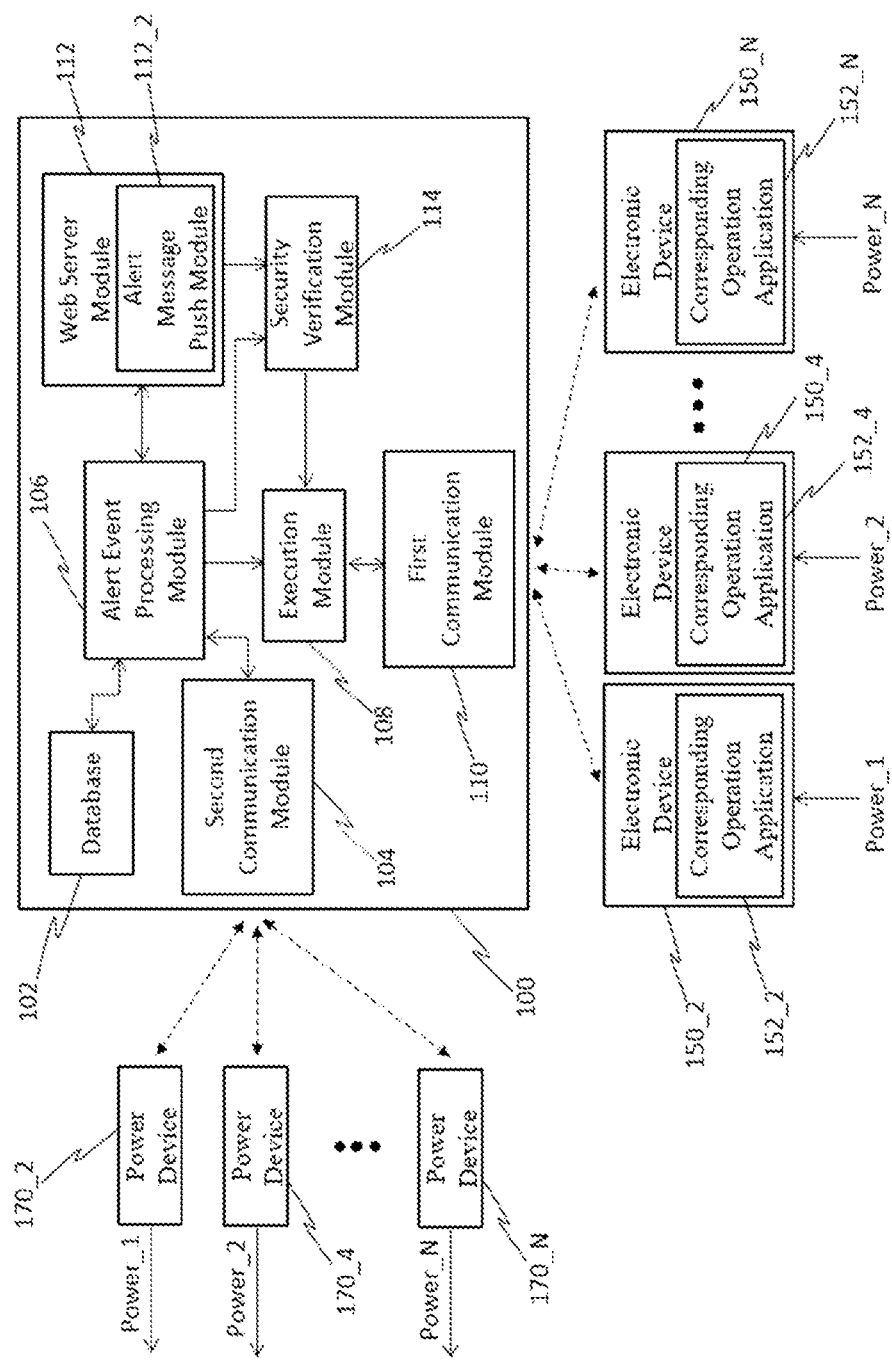
FIG. 1 shows a cloud server according to an embodiment of the present invention.

FIG. 1 shows a cloud server according to an embodiment of the present invention. Referring to FIG. 1, the cloud server 100 comprises a first communication module 110, a second communication module 104, a database 102, a web server module 112, an execution module 108, an alert event processing module 106, and a security verification module 114. The first communication module 110 is configured for communicatively connected at least one electronic device. In this embodiment, the first communication module 110 is communicatively connected to N electronic devices (respectively denoted by 150_2 to 150_N), where N is a positive integer. For the convenience of description, these electronic devices are taken as computers for example, and each electronic device is installed with a corresponding operation application (respectively denoted by 152_2 to 152_N).

In addition, the first communication module 110 communicates with the electronic devices 150_2 to 150_N according to a first TCP/IP protocol, where TCP means the Transmission Control Protocol, and IP means the Internet Protocol. The first TCP/IP protocol is selected from Hyper Text Transfer Protocol (hereinafter "HTTP protocol"), Hyper Text Transfer Protocol Secure (hereinafter "HTTPS protocol"), Message Queuing Telemetry Transport Protocol (hereinafter "MQTT protocol"), and Message Queuing Telemetry Transport Secure Protocol (hereinafter "MQTTS protocol"). In this embodiment, the first TCP/IP protocol adopts HTTPS protocol.

As to the second communication module 104, it is configured for communicatively connected at least one power device. In this embodiment, the second communication module 104 is communicatively connected to N power devices (respectively denoted by 170_2 to 170_N), and these power devices are configured for supplying power to the aforementioned electronic devices. In this embodiment, the power devices 170_2-170_N are configured to provide power sources Power_1-Power_N to the electronic devices 150_2-150_N, respectively. For the convenience of description, these power devices are taken as UPSs for example, and each power device comprises a plurality of sensors to detect the magnitude of the current, the magnitude of the voltage, the temperature, etc. In addition, the second communication module 104 communicates with the power devices 170_2 to 170_N according to a second TCP/IP protocol. The second TCP/IP protocol is also selected from HTTP protocol, HTTPS protocol, MQTT protocol and MQTTS protocol. In this embodiment, the second TCP/IP protocol adopts MQTTS protocol.

The database 102 is configured for storing a user setting. The user setting records a variety of different events that may occur on the power devices 170_2 to 170_N, an information of whether a corresponding warning needs to be issued when each event occurs, and a corresponding operation that the electronic devices 150_2 to 150_N need to perform for each event. In addition, the user setting also records an information of which electronic devices among the electronic devices 150_2 to 150_N each power device supplies power to, and records a reasonable value range corresponding to each sensed value of the power devices 170_2 to 170_N. The types of events that may occur on the power devices 170_2 to 170_N comprise Abnormal AC input events, Abnormal AC output events, abnormal battery power events, abnormal internal component events, abnormal load events and abnormal alarm events.

The so-called Abnormal AC input events are, for example, AC mains failure, abnormal AC input voltage, abnormal AC input current, abnormal AC input frequency, and the like. The so-called Abnormal AC output events are, for example, abnormal AC output voltage, abnormal AC output current, abnormal AC output frequency, and the like. The so-called abnormal battery power events are, for example, that the battery power is about to be exhausted, the battery voltage is too low, and the like. The so-called abnormal internal component events are, for example, internal component damage, battery damage, communication abnormality, and the like. The so-called abnormal load events are, for example, overload, short circuit of the load, and the like. The so-called abnormal alarm events are, for example, that the alarm does not sound the alarm, the alarm operation is abnormal, and the like. The aforementioned user setting records at least two events among the aforementioned various event types. For example, the user setting can record events such as AC mains failure, that the battery power is about to be exhausted, overload, etc.

The web server module 112 has an alert message pushing module 112_2. The user can install a user application corresponding to the cloud server 100 in his mobile device (e.g., a mobile phone, a notebook computer), so as to use the user application to link to the web server module 112. Thus, the user can view and access the information provided by the cloud server 100 after logging into the user interface of the user application, and can edit the aforementioned user setting. In addition, the mobile device of the user can also be linked to the web server module 112 through the Internet. Thus, the user can view and access the information provided by the cloud server 100 after logging into the web user interface provided by the web server module 112, and can edit the aforementioned user setting. Certainly, the aforementioned user setting can also record the correspondence between the electronic devices 150_2 to 150_N and the users.

Figure 2:
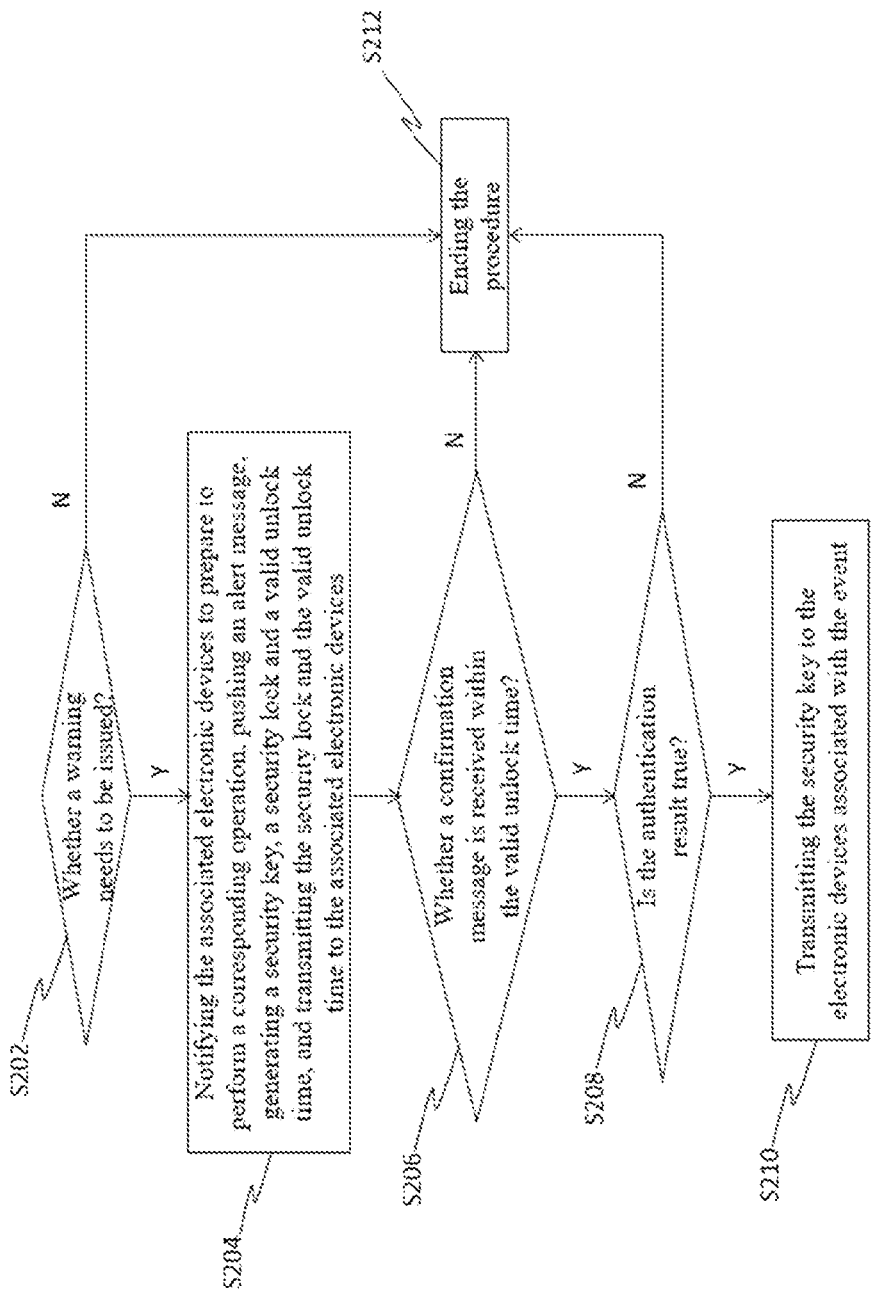
FIG. 2 is a flowchart of an operation method of the cloud server shown in FIG. 1.

Next, the operation of the cloud server 100 will be described with reference to FIG. 2. FIG. 2 is a flowchart of an operation method of the cloud server shown in FIG. 1. Referring to FIG. 1 and FIG. 2, the alert event processing module 106 is configured for receiving the information provided by the power devices 170_2 to 170_N through the second communication module 104, so as to determine whether an event occurs on any of the power devices, and determine whether a warning needs to be issued in response to the event according to the user setting (as shown in step S202). The method for the alert event processing module 106 to determine whether an event occurs on any of the power devices 170_2 to 170_N comprises determining whether the information provided by the power devices 170_2 to 170_N comprises information that the event has been detected. For example, when the power device 170_2 has detected that its battery is about to be depleted, it will provide such information to the cloud server 100, so that the alert event processing module 106 can determine that such an event occurs on the power device 170_2.

In addition, the method for the alert event processing module 106 to determine whether an event occurs on any of the power devices 170_2 to 170_N also comprises determining whether at least one sensed value in the information provided by the power devices 170_2 to 170_N exceeds its corresponding reasonable value range. For example, the power device 170_1 periodically (or irregularly) provides the sensed value of its AC input voltage to the cloud server 100, so that the alert event processing module 106 can search out the corresponding reasonable value range (for example, 105V-115V) from the aforementioned user setting accordingly, and determine whether the sensed value exceeds its corresponding reasonable value range. When the determination is yes, the alert event processing module 106 determines that an event of abnormal AC input voltage occurs on the power device 170_1.

When the alert event processing module 106 determines that an event occurs on a power device, and determines that a warning needs to be issued in response to the event according to the user setting (i.e., when the determination result of step S202 is yes), the alert event processing module 106 notifies the electronic devices associated with the event through the execution module 108 to prepare to perform the corresponding operation, and pushes an alert message to the relevant users through the alert message push module 112_2, wherein the alert message comprises a message asking whether to perform the corresponding operation of the event. For example, when the alert event processing module 106 determines that the battery of the power device 170_2 is about to be exhausted, and determines that a warning needs to be issued in response to the event according to the user setting, the alert event processing module 106 searches out that the power device 170_2 supplies power to the electronic device 150_2 from the user setting (i.e., searches out the electronic device associated with this event), and searches out a corresponding operation that the electronic device 150_2 needs to perform at this time from the user setting. The corresponding operation is, for example, a shutdown operation, an operation of shutting down at least one virtual machine, or both of the foregoing. In addition, the alert event processing module 106 also searches out who the user of the electronic device 150_2 is from the user setting (i.e., searches out the user associated with the event).

After that, the alert event processing module 106 notifies the electronic device 150_2 through the execution module 108 to prepare to perform the corresponding operation, and pushes an alert message to the user of the electronic device 150_2 through the alert message push module 112_2, wherein the alert message comprises a message asking whether to perform the corresponding operation of the event. At the same time, the alert event processing module 106 also notifies the security verification module 114 to generate a security key, a security lock and an effective unlocking time. The security verification module 114 generates the aforementioned security key and security lock according to an algorithm.

The aforementioned algorithms for generating the security key and the security lock may adopt HMAC-SHA1 algorithm, HMAC-SHA512 algorithm, SHA256 algorithm, MD5 algorithm, MD6 algorithm, BASE64 algorithm, AES128 algorithm, AES256 algorithm, TLS 1.2 algorithm, etc., where HMAC means Hash-based Message Authentication Code, SHA means Secure Hash Algorithm, MD5 means MD5 Message-Digest, MD6 means MD6 Message-Digest, AES means Advanced Encryption Standard, and TLS means Transport Layer Security. Next, the security verification module 114 transmits the security lock and the valid unlocking time to the electronic device 150_2 through the execution module 108, that is, transmits the security lock and the valid unlocking time to the electronic devices associated with the event (as shown in step S204). On the other hand, when the determination result of step S202 is no, the cloud server 100 ends the procedure (as shown in step S212).

In this embodiment, the alert message push module 112_2 can push the aforementioned alert message to a mobile device of the user of the electronic device 1502, so that the mobile device can display the content of the alert message by a user interface of it user application. As mentioned above, the alert message comprises a message asking whether to perform the corresponding operation of the event. If the user has logged into the user interface of the user application, the user can view the alert message and respond to the question in the alert message. Certainly, the alert message pushing module 122_2 can also use an email to push the alert message to a mobile device of the user of the electronic device 150_2. The email has a web page link for the mobile device to link to a web user interface provided by the web server module 112, so that the content of the alert message can be displayed by the web user interface. As mentioned above, the alert message also comprises a message asking whether to perform the corresponding operation of the event. If the user has logged into the aforementioned web user interface, the user can view the alert message, and respond to the question in the alert message. In addition, the web server module 112 further informs a telecommunication service provider to send a short message to the mobile device. The short message comprises a SMS verification code for the user to enter the SMS verification code when viewing the content of the alert message.

After the execution of step S204, the security verification module 114 determines whether a confirmation message confirming the execution of the corresponding operation is received through the web server module 112, and determines whether the confirmation message is received within the valid unlocking time (as shown in step S206). The confirmation message comprises a login authentication code and the SMS verification code, wherein the login authentication code is generated when the user logs into the user interface or the web user interface. The login authentication code can be a one-time password, a session code or a session key.

When the determination result of step S206 is no, the cloud server 100 ends the procedure (as shown in step S212). On the other hand, when the determination result of step S206 is yes, the security verification module 114 verifies the identity of the user according to the login authentication code and the SMS verification code in the confirmation message, so as to determine whether the result of the identity verification is true (as shown in step S208). When the determination result of step S208 is no, the cloud server 100 ends the procedure (as shown in step S212). On the other hand, when the determination result of step S208 is yes, the security verification module 114 transmits the security key to the electronic device 150_2 through the execution module 108, that is, transmits the security key to the electronic devices associated with the event (as shown in Step S210), so that the electronic device 150_2 can perform an unlocking operation on the security lock accordingly, and perform the corresponding operation after unlocking.

Certainly, after logging into the user interface or the network user interface, the user can also provide a stop command to the cloud server 100 by the user interface or the network user interface. The stop command is used for confirming to stop executing the corresponding operation, and the stop command also comprises the aforementioned login authentication code. Therefore, the security verification module 114 also determines whether the stop command is received through the web server module 112. When the security verification module 114 receives the stop command, the security verification module 114 performs an identity verification according to the login authentication code in the stop command, so as to determine whether the result of the identity verification is true. When the determination result is true, the security verification module 114 encrypts the received stop command, and transmits the encrypted stop command to the electronic device 150_2 through the execution module 108.

It is worth mentioning that, according to different design requirements, the cloud server 100 can also not transmit the valid unlock time generated by the security verification module 114 to the electronic devices associated with the event. In addition, according to different design requirements, the cloud server 100 can also not inform a telecommunication service provider to send the short message to the mobile device. Certainly, in this case, the user does not need to enter the SMS verification code when viewing the content of the aforementioned alert message, and the confirmation message only contains the login authentication code, not the SMS verification code. Therefore, the security verification module 114 only needs to perform the identity verification according to the login authentication code in the confirmation message. In addition, the cloud server 100 can also not encrypt the stop command.

Figure 3:
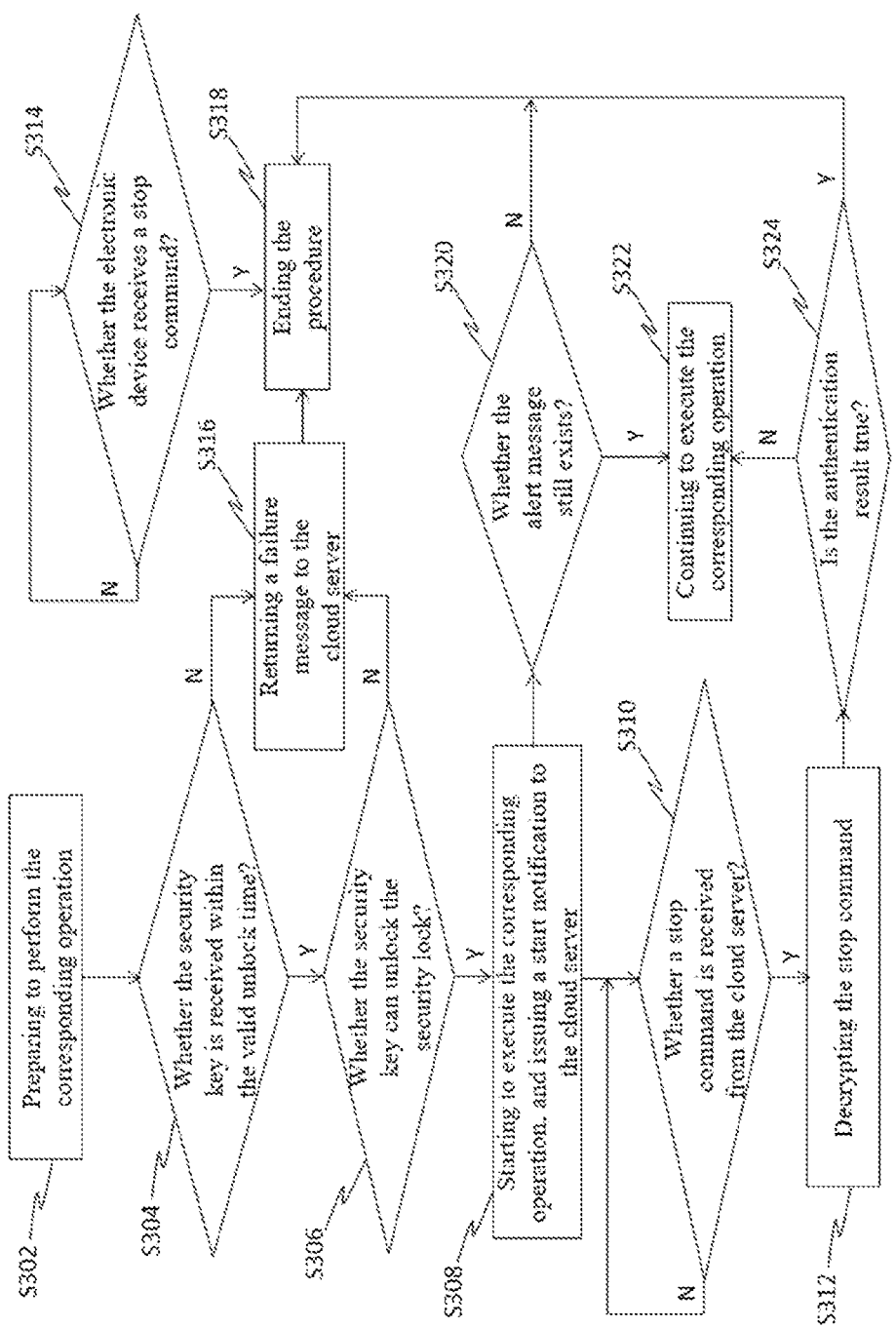
FIG. 3 is a flowchart of an operation method of the corresponding operation application shown in FIG. 1.

Next, the operation of the corresponding operation application in the electronic device will be described with reference to FIG. 3. FIG. 3 is a flowchart of an operation method of the corresponding operation application shown in FIG. 1. For the convenience of description, the following description will be given by using the corresponding operation application 152_2 in the electronic device 150_2. Referring to FIG. 1 and FIG. 3, after the corresponding operation application 152_2 in the electronic device 150_2 receives the notification indicating to prepare for the corresponding operation, the corresponding operation application 152_2 starts to prepare to perform the corresponding operation (as shown in step S302). Next, the corresponding operation application 152_2 determines whether the security key is received within the aforementioned valid unlocking time (as shown in step S304). When the determination result of step S304 is no, the corresponding operation application 152_2 returns a failure message to the cloud server 100 (as shown in step S316), and then ends the procedure (as shown in step S318). On the other hand, when the determination result of step S304 is yes, the corresponding operation application 152_2 further determines whether the received security key can unlock the security lock (as shown in step S306).

When the determination result of step S306 is no, the corresponding operation application 152_2 returns a failure message to the cloud server 100 (as shown in step S316), and then ends the procedure (as shown in step S318). On the other hand, when the determination result of step S306 is yes, the corresponding operation application 152_2 controls the electronic device 150_2 to start the corresponding operation, and correspondingly sends a start notification to the cloud server 100 (as shown in step S308). Next, the corresponding operation application 152_2 continuously determines whether a stop command from the cloud server 100 is received (as shown in step S310). At the same time, the corresponding operation application 152_2 also continuously determines whether the alert message still exists (as shown in step S320). When the alert event processing module 106 of the cloud server 100 determines that any of the fulfillment conditions of the alert message previously sent by it has been lifted, the alert event processing module 106 informs the corresponding operation application 152_2 that the alert message previously sent no longer exists through the execution module 108.

When the determination result of step S310 is no, the corresponding operation application 152_2 returns to step S310. On the other hand, when the determination result of step S310 is yes, the corresponding operation application 1522 decrypts the received stop command (as shown in step S312). Next, the corresponding operation application 152_2 verifies the identity of the aforementioned user according to the login authentication code in the stop command, so as to determine whether the result of the identity verification is true (as shown in step S324). When the determination result of step S324 is no, the corresponding operation application 152_2 controls the electronic device 150_2 to continue to perform the corresponding operation (as shown in step S322). On the other hand, when the determination result of step S324 is yes, the corresponding operation application 152_2 ends the procedure (as shown in step S318).

On the other hand, when the determination result of step S320 is yes, the corresponding operation application 152_2 controls the electronic device 150_2 to continue to perform the corresponding operation (as shown in step S322). On the other hand, when the determination result of step S320 is no, the corresponding operation application 152_2 ends the procedure (as shown in step S318). In addition, if the electronic device 150_2 has an input interface (such as buttons, switches, touch screens, etc.), and the user can input a stop command through the input interface, the corresponding operation application 152_2 will also determine whether the electronic device 150_2 receives a stop command (as shown in step S314). When the determination result of step S314 is no, the corresponding operation application 152_2 returns to step S314. On the other hand, when the determination result of step S314 is yes, the corresponding operation application 152_2 ends the procedure (as shown in step S318).

Certainly, if the cloud server 100 is designed not to transmit the valid unlock time to the electronic device 1502, or is designed not to encrypt the stop command, the operation process of the corresponding operation application 152_2 must be adjusted accordingly.

Although in the above embodiment, the electronic devices 150_2 to 150_N are all taken as computers for example, this is not intended to limit the present invention. Those skilled in the art should know that each of the above electronic devices can also be selected from a server, a router, network equipment, communication equipment, medical equipment, or other electronic device, users can mix and match according to actual needs. In addition, although in the above embodiment, the power devices 170_2 to 170_N are all taken as UPSs for example, this is not intended to limit the present invention. Those skilled in the art should know that each of the above power devices can also be selected from a power distribution unit, an auto transfer switch, a smart power strip, a smart plug, and a photovoltaic inverter (PV inverter for short), users can mix and match according to actual needs. In addition, although in the above embodiment, the number of the electronic devices and the power devices are both N, this is not intended to limit the present invention. Those skilled in the art should know that the number of the electronic devices and the power devices can be adjusted according to actual needs. In addition, each of the aforementioned power devices can also supply power to a plurality of electronic devices, as long as the user setting records the information of which electronic devices each power device supplies power to.

As can be seen from the above description, the cloud server 100 of the present invention allows the user to remotely decide whether to approve the electronic devices associated with an event to perform a corresponding operation of the event, which solves the shortcoming of the prior art. In addition, since the cloud server 100 of the present invention uses a security key, a security lock and a valid unlock time, and authenticates the user, the security of remote control in a cloud environment is improved.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cloud server, comprising:
   a first communication module, for communicatively connecting at least one electronic device;
   a second communication module, for communicatively connecting at least one power device, the power devices being configured for supplying power to the electronic devices;
   a database, for storing a user setting, the user setting records a variety of different events that may occur on the power devices, and records a corresponding operation that the electronic devices need to perform for each event;
   a web server module, having an alert message push module;
   an execution module;
   an alert event processing module, for receiving the information provided by the power devices through the second communication module, so as to determine whether an event occurs on any of the power devices, and determine whether a warning needs to be issued in response to the event according to the user setting, wherein when both are determined to be yes, the alert event processing module notifies the electronic devices associated with the event through the execution module to prepare to perform the corresponding operation, and pushes an alert message to a mobile device through the alert message push module, wherein the alert message comprises a message asking a user of the mobile device whether to perform the corresponding operation of the event; and
   a security verification module, wherein when the alert event processing module determines that the warning needs to be issued, the security verification module generates a security key and a security lock according to an algorithm, and generates a valid unlock time, and transmits the security lock to the electronic devices associated with the event through the execution module, the security verification module is also used to receive, through the web server module, a confirmation message from the mobile device, the confirmation message is used for confirming that at least one of the electronic devices is to perform the execution of the corresponding operation, the security verification module is also used to determine whether the confirmation message is received within the valid unlocking time, when the confirmation message is received within the valid unlocking time, the security verification module transmits the security key to the electronic devices associated with the event through the execution module, so that the electronic devices associated with the event can perform an unlocking operation on the security lock accordingly and can perform the corresponding operation after unlocking.

2. The cloud server as claimed in claim 1, wherein the security verification module further transmits the valid unlocking time to the electronic devices associated with the event through the execution module.

3. The cloud server as claimed in claim 1, wherein the user setting further records an information of which electronic devices among the electronic devices each power device supplies power to.

4. The cloud server as claimed in claim 1, wherein the alert event processing module to determines whether an event occurs on any of the power devices by determining whether the information provided by the power devices comprises information that the event has been detected, and by determining whether at least one sensed value in the information provided by the power devices exceeds its corresponding predetermined value range.

5. The cloud server as claimed in claim 4, wherein the user setting further records a predetermined value range corresponding to each sensed value.

6. The cloud server as claimed in claim 1, wherein the power devices comprise at least one of an uninterruptible power system, a power distribution unit, an auto transfer switch, a smart power strip, a smart plug and a photovoltaic inverter.

7. The cloud server as claimed in claim 6, wherein the power devices comprise at least one uninterruptible power system, and the type of the event is an abnormal AC input event, an abnormal AC output event, an abnormal battery power event, an abnormal internal component event, an abnormal load event or an abnormal alarm event.

8. The cloud server as claimed in claim 1, wherein the first communication module communicates with the electronic devices according to a first TCP/IP protocol, and the second communication module communicates with the power devices according to a second TCP/IP protocol.

9. The cloud server as claimed in claim 8, wherein the first TCP/IP protocol and the second TCP/IP protocol are selected from an HTTP protocol, an HTTPS protocol, a MQTT protocol and a MQTTS protocol.

10. The cloud server as claimed in claim 1, wherein the alert message push module pushes the alert message to a mobile device, so that the mobile device can display the content of the alert message by a user interface of a user application.

11. The cloud server as claimed in claim 1, wherein the alert message pushing module uses an email to push the alert message to a mobile device, the email has a web page link for linking to a web user interface, so that the content of the alert message can be displayed by the web user interface.

12. The cloud server as claimed in claim 10, wherein the web server module further informs a telecommunication service provider to send a short message to the mobile device, and the short message comprises a SMS verification code for a user to enter the SMS verification code when viewing the content of the alert message.

13. The cloud server as claimed in claim 12, wherein the confirmation message comprises a login authentication code and the SMS verification code, and the security verification module further verifies the identity of the user according to the login authentication code and the SMS verification code, the login authentication code is generated when logging into the user interface or the web user interface.

14. The cloud server as claimed in claim 13, wherein the login authentication code comprises a one-time password, a session code or a session key.

15. The cloud server as claimed in claim 10, wherein the confirmation message comprises a login authentication code for the security verification module to perform an identity verification, and the login authentication code is generated when logging into the user interface or the web user interface.

16. The cloud server as claimed in claim 15, wherein the login authentication code comprises a one-time password, a session code or a session key.

17. The cloud server as claimed in claim 1, wherein the corresponding operation comprises at least one of a shutdown operation and an operation of shutting down at least one virtual machine.

18. The cloud server as claimed in claim 10, wherein the security verification module is further configured to receive a stop command confirming to stop executing the corresponding operation through the web server module, and after encrypting the stop command, the security verification module transmits the encrypted stop command to the electronic devices associated with the event through the execution module.

19. The cloud server as claimed in claim 18, wherein the security verification module further performs an identity verification on the stop command.

20. The cloud server as claimed in claim 19, wherein the stop command comprises a login authentication code, and the login authentication code is generated when logging into the user interface or the web user interface.

21. An operation method of a cloud server, the cloud server comprising a first communication module and a second communication module, the first communication module being used for communicatively connecting at least one electronic device, the second communication module being used for communicatively connecting at least one power device, and the power devices being configured for supplying power to the electronic devices, the operation method comprising following steps:
receiving information provided by the power devices through the second communication module, and determining whether an event occurs on any of the power devices accordingly;
determining whether a warning needs to be issued in response to the event according to a user setting, wherein the user setting records a variety of different events that may occur on the power devices, and records a corresponding operation that the electronic devices need to perform for each event;
when it is determined that the warning needs to be issued, notifying the electronic devices associated with the event to prepare to perform the corresponding operation, pushing an alert message to a mobile device, generating a security key and a security lock according to an algorithm, and generating a valid unlock time, and transmitting the security lock to the electronic devices associated with the event, wherein the alert message comprises a message asking a user of the mobile device whether to perform the corresponding operation of the event;
determining whether a confirmation message is received from the mobile device to confirm that execution of the corresponding operation is to be performed, and determining whether the confirmation message is received within the valid unlocking time; and
when it is determined that the confirmation message is received within the valid unlocking time, transmitting the security key to the electronic devices associated with the event, so that the electronic devices associated with the event can perform an unlocking operation on the security lock accordingly and can perform the corresponding operation after unlocking.

22. The operation method of the cloud server as claimed in claim 21, wherein the cloud server further transmits the valid unlocking time to the electronic devices associated with the event.

23. The operation method of the cloud server as claimed in claim 21, wherein the user setting further records an information of which electronic devices among the electronic devices each power device supplies power to.

24. The operation method of the cloud server as claimed in claim 21, wherein the method for determining whether an event occurs on any of the power devices comprises determining whether the information provided by the power devices comprises information that the event has been detected, and comprises determining whether at least one sensed value in the information provided by the power devices exceeds its corresponding predetermined value range.

25. The operation method of the cloud server as claimed in claim 24, wherein the user setting further records a predetermined value range corresponding to each sensed value.

26. The operation method of the cloud server as claimed in claim 21, wherein the power devices comprise at least one of an uninterruptible power system, a power distribution unit, an auto transfer switch, a smart power strip, a smart plug and a photovoltaic inverter.

27. The operation method of the cloud server as claimed in claim 21, wherein the power devices comprise at least one uninterruptible power system, and the type of the event is an abnormal AC input event, an abnormal AC output event, an abnormal battery power event, an abnormal internal component event, an abnormal load event or an abnormal alarm event.

28. The operation method of the cloud server as claimed in claim 21, wherein the cloud server pushes the alert message to the mobile device, so that the mobile device can display the content of the alert message by a user interface of a user application.

29. The operation method of the cloud server as claimed in claim 21, wherein the cloud server uses an email to push the alert message to a mobile device, the email has a web page link for linking to a web user interface, so that the content of the alert message can be displayed by the web user interface.

30. The operation method of the cloud server as claimed in claim 28, wherein the cloud server further informs a telecommunication service provider to send a short message to the mobile device, and the short message comprises a SMS verification code for a user to enter the SMS verification code when viewing the content of the alert message.

31. The operation method of the cloud server as claimed in claim 30, wherein the confirmation message comprises a login authentication code and the SMS verification code, and the security verification module further verifies the identity of the user according to the login authentication code and the SMS verification code, the login authentication code is generated when logging into the user interface or the web user interface.

32. The operation method of the cloud server as claimed in claim 31, wherein the login authentication code comprises a one-time password, a session code or a session key.

33. The operation method of the cloud server as claimed in claim 28, wherein the confirmation message comprises a login authentication code for the security verification module to perform an identity verification, and the login authentication code is generated when logging into the user interface or the web user interface.

34. The operation method of the cloud server as claimed in claim 33, wherein the login authentication code comprises a one-time password, a session code or a session key.

35. The operation method of the cloud server as claimed in claim 21, wherein the corresponding operation comprises at least one of a shutdown operation and an operation of shutting down at least one virtual machine.

36. The operation method of the cloud server as claimed in claim 28, wherein the cloud server is further configured to receive a stop command confirming to stop executing the corresponding operation, and after encrypting the stop command, the cloud server transmits the encrypted stop command to the electronic devices associated with the event through the execution module.

37. The operation method of the cloud server as claimed in claim 36, wherein the cloud server further performs an identity verification on the stop command.

38. The operation method of the cloud server as claimed in claim 37, wherein the stop command comprises a login authentication code, and the login authentication code is generated when logging into the user interface or the web user interface.

39. The cloud server as claimed in claim 11, wherein the web server module further informs a telecommunication service provider to send a short message to the mobile device, and the short message comprises a SMS verification code for a user to enter the SMS verification code when viewing the content of the alert message.

40. The cloud server as claimed in claim 39, wherein the confirmation message comprises a login authentication code and the SMS verification code, and the security verification module further verifies the identity of the user according to the login authentication code and the SMS verification code, the login authentication code is generated when logging into the user interface or the web user interface.

41. The cloud server as claimed in claim 40, wherein the login authentication code comprises a one-time password, a session code or a session key.

42. The cloud server as claimed in claim 11, wherein the confirmation message comprises a login authentication code for the security verification module to perform an identity verification, and the login authentication code is generated when logging into the user interface or the web user interface.

43. The cloud server as claimed in claim 42, wherein the login authentication code comprises a one-time password, a session code or a session key.

44. The cloud server as claimed in claim 11, wherein the security verification module is further configured to receive a stop command confirming to stop executing the corresponding operation through the web server module, and after encrypting the stop command, the security verification module transmits the encrypted stop command to the electronic devices associated with the event through the execution module.

45. The cloud server as claimed in claim 44, wherein the security verification module further performs an identity verification on the stop command.

46. The cloud server as claimed in claim 45, wherein the stop command comprises a login authentication code, and the login authentication code is generated when logging into the user interface or the web user interface.

47. The operation method of the cloud server as claimed in claim 29, wherein the cloud server further informs a telecommunication service provider to send a short message to the mobile device, and the short message comprises a SMS verification code for a user to enter the SMS verification code when viewing the content of the alert message.

48. The operation method of the cloud server as claimed in claim 47, wherein the confirmation message comprises a login authentication code and the SMS verification code, and the security verification module further verifies the identity of the user according to the login authentication code and the SMS verification code, the login authentication code is generated when logging into the user interface or the web user interface.

49. The operation method of the cloud server as claimed in claim 48, wherein the login authentication code comprises a one-time password, a session code or a session key.

50. The operation method of the cloud server as claimed in claim 29, wherein the confirmation message comprises a login authentication code for the security verification module to perform an identity verification, and the login authentication code is generated when logging into the user interface or the web user interface.

51. The operation method of the cloud server as claimed in claim 50, wherein the login authentication code comprises a one-time password, a session code or a session key.

52. The operation method of the cloud server as claimed in claim 29, wherein the cloud server is further configured to receive a stop command confirming to stop executing the corresponding operation, and after encrypting the stop command, the cloud server transmits the encrypted stop command to the electronic devices associated with the event through the execution module.

53. The operation method of the cloud server as claimed in claim 52, wherein the cloud server further performs an identity verification on the stop command.

54. The operation method of the cloud server as claimed in claim 53, wherein the stop command comprises a login authentication code, and the login authentication code is generated when logging into the user interface or the web user interface.

* * * * *